United States Patent [19]
Allen et al.

[11] Patent Number: 5,500,936
[45] Date of Patent: Mar. 19, 1996

[54] MULTI-MEDIA SLIDE PRESENTATION SYSTEM WITH A MOVEABLE, TRACKED POPUP MENU WITH BUTTON AND TITLE BARS

[75] Inventors: Paul G. Allen, Bellevue; Stephen P. Bard, Redmond; Robert W. Gallup, Seattle, all of Wash.

[73] Assignee: Asymetrix Corporation, Bellevue, Wash.

[21] Appl. No.: 30,944

[22] Filed: Mar. 12, 1993

[51] Int. Cl.$^6$ .................................................. G06F 36/00
[52] U.S. Cl. .................... 395/156; 395/154; 395/157; 395/160
[58] Field of Search ...................... 395/155–161, 395/154, 152, 153; 345/117–120, 122, 146

[56] References Cited

U.S. PATENT DOCUMENTS

| | | | |
|---|---|---|---|
| 4,772,882 | 9/1988 | Mical | 395/156 |
| 4,813,013 | 3/1989 | Dunn | 395/159 |
| 4,862,389 | 8/1989 | Takagi | 395/157 |
| 4,931,783 | 1/1990 | Atkinson | 395/156 |
| 5,179,653 | 1/1993 | Fuller | 395/156 |
| 5,192,999 | 3/1993 | Graczyk et al. | 395/154 X |
| 5,363,482 | 11/1994 | Victor et al. | 395/157 |

OTHER PUBLICATIONS

Action! User–Guide, Macromedia, Inc., 1992, pp. 1, 67–77, 185–199.
Microsoft Windows, v. 3.1, 1992, screen pp. 1–4.
MacDraw Pro User's Guide, Clavis Corp., 1991, Chpt. 7, Appendius B, D, E.
MacDraw Pro User's Guide, Claris Corp, 1991, pp. 5–14 to 5–40.
Advanced Inface Design Guide, IBM Corp, Jun. 1989, pp. 29–34, 40–41, 46–48, 63–81, 95–98.
Pompili, "Word Perfect for Windows Debuts", PC Week, Nov. 19, 1990, p. 3961.
"Word Perfect for Windows", Word Perfect Corp., Apr. 1992, Screen p. 1.
Learning How to Use the Iris, Working in a New Space, Documentation Supplement, 1989, pp. 2–31, 2–33.

*Primary Examiner*—Mark R. Powell
*Assistant Examiner*—John E. Breene
*Attorney, Agent, or Firm*—LaRiviere, Grubman & Payne

[57] ABSTRACT

A system for a multimedia slide presentation having a computer, display screen, sound system, video disc, video cassette recorder, photo compact disc drive, compact disc read only memory (CD ROM), and a pointing device (trackball or mouse). Each slide may contain photographs, text, graphics, and charts, or any combination of various media. By actuating and releasing the second control button of the mouse or trackball, a tracked, popup menu is displayed in the multimedia slide system and aids the user to make selections that operate on the slides and objects on the slides. The popup menu contains a button bar, a title bar, and a list of textual menu items. Buttons in the button bar provide an appealing "shortcut" to frequently used commands. The text menu items may also indicate another cascaded, popup menu when selected.

1 Claim, 2 Drawing Sheets

MULTI-MEDIA SLIDE PRESENTATION SYSTEM WITH A MOVEABLE, TRACKED POPUP MENU WITH BUTTON AND TITLE BARS

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

TECHNICAL FIELD

The present invention relates to a User Interface (UI) for use with computer systems. More particularly, the present invention provides increased functionality for computer system pointing devices used with a presentation graphics program which is used with a Graphics User Interface (GUI) for creating a multi-media slide presentation on a personal computer.

BACKGROUND ART

In the context of the present invention, a presentation is a group of visual aids or slides that are designed and produced to deliver information, whether on a computer screen, a transparency, or overhead projector. On a personal computer system, a slide comprises one screen of information which corresponds to a photographic slide or transparency. Each slide may include text, graphics and charts, or any combination thereof, that is effective or delivering a desired message.

The slides comprising a presentation produced on a personal computer are stored together as a file. Playback of such files may be initiated automatically or manually. In automatic playback, each slide is displayed on a computer screen for a predetermined time before transition is made to the next slide and so on until all of the slides in the presentation file have been displayed. Alternatively, in manual mode, each slide is manually accessed and displayed for as long as the user wishes while discussing the topics shown.

Multi-media slides incorporate data from present-day multi-media devices to add sound effects, animation and video to the text, graphics and charts produced by the computer itself. Even if multi-media is unavailable, computer programs for producing presentations can add many special effects such as transitions between slides and animation.

Presentation graphics programs can also incorporate information created in another program, such as a spreadsheet application. Typically such presentations may be printed out to provide audience handouts and speaker notes.

GUIs for use on computer systems of all sizes and complexities have become extremely popular and important to operators and users of computer systems. It is now well recognized that recognizing graphics is faster than reading text. In the personal computer industry, the Macintosh GUI, produced by Apple Computer Company and Windows Interface Program GUI, produced by Microsoft Corporation, for use on personal computers, such as the PS/2 produced by IBM Corporation, provide convenient, well-known and easily recognized symbols, icons, screen paradigms and all other manner of graphical representations of computer functionality easily manufactured by users. The Iris System used on work station level computer systems, produced by Silicon Graphics, Inc., and Open Book, similarly used on work station computer systems produced by Sun Microsystems, Inc., both provide well-recognized, easily used GUIs. UIs provide enhancements and extensions to GUIs.

GUIs are often used with other applications programs such as word processing and spreadsheet programs. Thus, for example, Word Perfect 5.1 word processing may be used with Windows on a personal computer, model PS/2, produced by IBM Corporation.

While a GUI may be manipulated using a computer keyboard only, the pointing device of choice by most users is a mouse or track ball. These devices are used for moving a cursor across the screen of a computer system to point to or identify a particular object or function the user desires to access or initiate, respectively. Movement of the mouse or the trackball initiates corresponding movement of the cursor across the screen. When the cursor reaches the point or object of interest on the screen, the object is accessed or the function is initiated by actuating one of at least two buttons that form a part of the mouse or trackball.

It should be noted that some GUIs provide the capability to invert the typical functionality of the pointing device buttons. Therefore, while the so-called "left" button is active according to the usual convention, the "right" button may become active if so desired by the user. Thus, for purposes of describing the present invention, the first button refers to the usually active button for selecting objects and icons and initiating actions according to the prior art, and the second button will refer to the newly added functionality of a pointing device according to the present invention.

In a typical GUI, a menu is provided. A menu is a list of items presented to the user from which the user can select one or more items. The selection made by the user is interpreted by the application for whatever purpose it desires. Typically, it is interpreted as an action on a selected item (cut, copy, paste, delete, . . .) or the program or data as a whole (save, file, open file, spell check, . . . ).

A popup menu is a menu that is displayed to the user only temporarily. Through some activating sequence (a mouse click or a key stroke), the user activates the display of a list of items (a menu) from which the user is expected to make a selection. After the selection is completed, the menu is removed from the display. Thus, the menu is said to 'pop up' in front of the user when requested and dismissed after used.

A tracked popup menu is a popup menu that is not anchored to appear in the same place on the screen every time it is invoked. A tracked popup menu is said to 'float' about on the screen, appearing in the visual context that makes sense to the user. Typically, programs use tracked popup menus to temporarily provide a list of operations associated with a selected object on the screen near the object. Tracked popup menus may be activated by any sequence of events defined in the application. However, the accepted industry standard for access to a tracked popup menu is to click the right or secondary button of the mouse. Typically, in response to a 'right' click, the application creates a tracked popup menu at or near the current location of the mouse. To date, tracked popup menus have been composed of individual text string and image items presented to the user as a list. It should be noted that, even though a prior art tracked popup menu is not anchored in the same place every time it is invoked, it cannot be dragged or moved on the screen once it is invoked.

As personal computers have become more powerful, in both the speed with which they process data and the amount of data they can process, the functionality and complexity of GUIs has grown. Correspondingly, the need to add functionality to pointing devices has similarly increased. Thus, it is desirable to add functionality to pointing devices by defining computer functionality and behavior upon actuation or pressing the second or right button of a pointing device over an object created by a user or a personal computer system having a GUI.

For purposes of describing the present invention, it should be noted that each slide comprises a template on which objects such as text, graphics and charts are placed. The template, as used herein, comprises a choice of background designs for enhancing display of the objects which appear to be overlayed on the desired background design. As indicated earlier, objects may also include video and animation, which also appear as overlays on the background design provided by the template.

DISCLOSURE OF INVENTION

Actuation of the second button of a mouse or trackball device, according to the present invention, creates a moveable, enhanced, tracked, pop-up menu at the location of the cursor on the screen at which the user depresses the second button.

In addition to text strings and image items in a traditional tracked popup menu, the present invention includes a title bar and a button bar. The title bar can be used to communicate the name and or the context of the menu to the user. The button bar can contain any number of buttons arranged in an horizontal tiling (like a tool bar) that represent some of the operations provided by the menu. The buttons provide a visually appealing shortcut for frequently accessed commands.

The pop-up menu of the present invention lists items relative to the object on which the cursor is located which allows the user to 1) inspect and manipulate properties, 2) access help, and 3) perform operations. The title bar, which optimally includes a related icon, identifies the object upon which the second button of the pointing device was clicked. The button bar is similar to the main button bar of a typical GUI. In some instances where the functionality is the same, the same icon that is used on the main menu bar of the GUI is used to designate that function.

When a second button down message is intercepted, the object at the click position is then identified and selected prior to launching a program module for the appropriate version of the pop-up menu corresponding to the type of object clicked. When the pop-up menu is displayed in response to actuation of the second button on the pointer device, the user may drag the menu to a new location on the display or drag the cursor over the pop-up menu items. Until the user selects an item from the menu by actuating the first button of the pointer device, no action will be initiated in response to the menu item selected.

BRIEF DESCRIPTION OF DRAWINGS

For fuller understanding of the present invention, reference is made to the accompanying drawing in the following detailed description of the Best Mode For Carrying Out the Invention. In the drawing.

Figure 1:
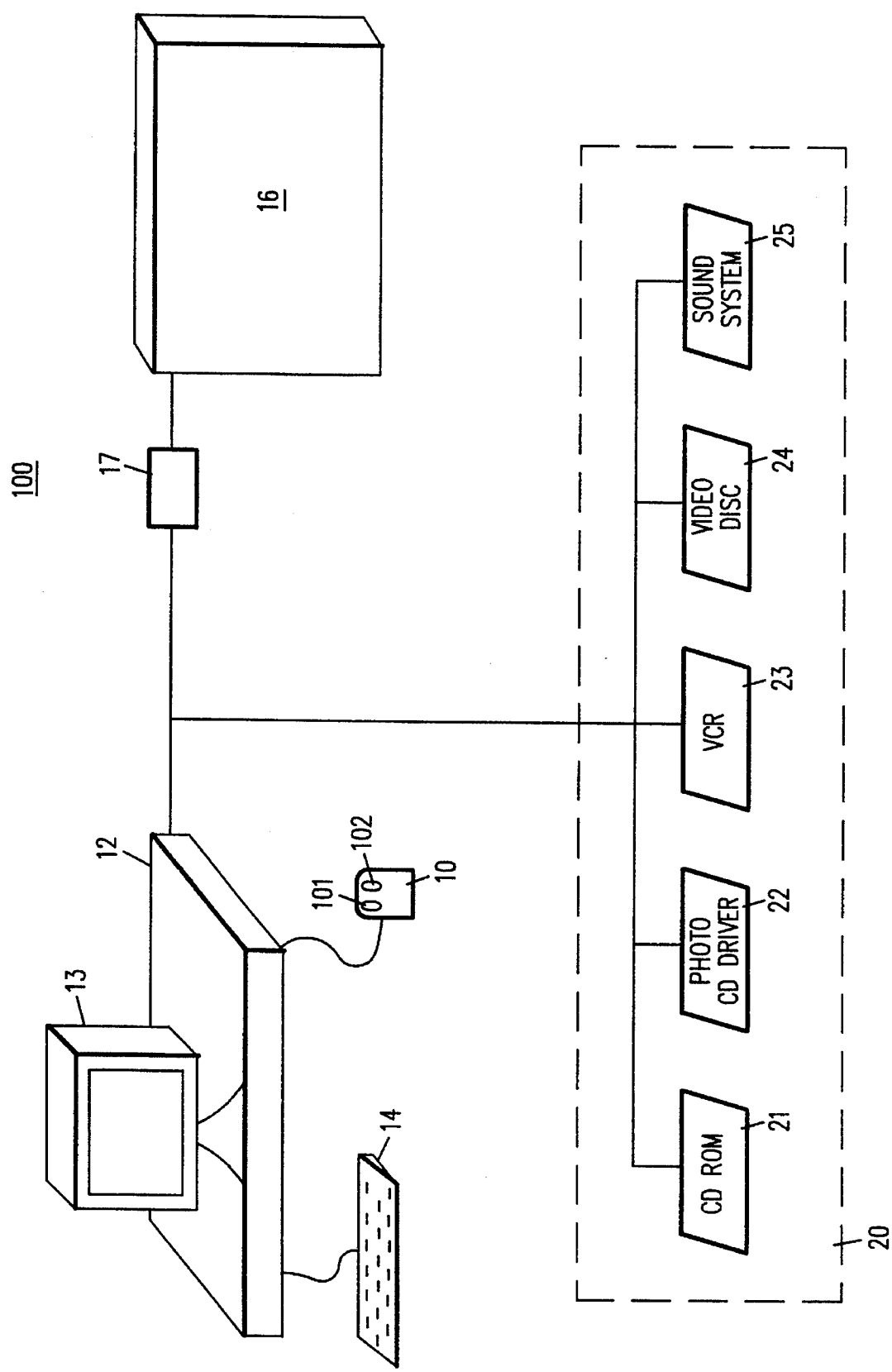
FIG. 1 illustrates a system for producing multi-media slide presentations which incorporates the increased functionality of pointing devices according to the present invention.

Reference numbers refer to the same or equivalent parts of the present invention throughout the several figures of the drawing.

BEST MODE FOR CARRYING OUT THE INVENTION

Referring to FIG. 1, system 100 having a UI cooperating with a GUI which includes a pointing device having increased functionality according to the present invention for creating a multi-media slide presentation on a personal computer comprises pointing device 10 coupled to computer 12. Monitor 13 and input keyboard 14 are also coupled to computer 12. In addition, multi-media devices 20, typically comprising CD ROM 21, photo CD drive 22, video cassette recorder (VCR) 23, video disk drive 24 and sound system 25, are also coupled to computer 12.

Computer 12 is typically a personal computer, such as an IBM PS/2 or equivalent, having 20 megahertz operating speed and a 80386 SX microprocessor, manufactured by Intel Corp., or equivalent, on which an MS-DOS 3.1 operating system, together with a Microsoft Windows 3.1 GUI is installed. Pointing device 10 should be a Windows-compatible mouse, trackball or other pointing device having at least first and second control buttons 101 and 102, respectively. Computer 12 should also include a floppy disk drive, a hard disk with at least 4 to 12 megabytes of available disk space, at least 2 megabytes of random access memory (RAM) and a graphics adapter card such as VGA, Super VGA or other Windows-compatible adapter. The design of the components of system 100 forms no part of the present invention.

The GUI is more particularly described in the User's Guide For The Windows Graphical Environment, MS-DOS Operating System, published by Microsoft Corporation, 1990–92, which is incorporated by reference as if fully set forth herein. The specific design of the GUI forms no part of the present invention.

UIs may be considered extensions of GUIs which add functionality and graphical representations which are not typically part of a currently available GUI. Therefore, all of the functions and graphical representations provided by a UI could be incorporated into most GUIs.

In addition, in order to utilize multi-media capabilities, computer 12 should include a 256-color video adapter and a Windows-compatible version 3.1 driver, a Media Controlled Interface (MCI) compatible sound card for playback of wave audio and Musical Instrument Digital Interface (MIDI) files, a video data capture program, and a video overlay board. The design of the components of system 100 also forms no part of the present invention.

All of the foregoing elements of system 100 are portable and may be transported to the presentation site. Although it is not a necessity, it may be desirable to have a large screen 16 disposed in the room where the presentation is to be given. The large screen 16 may have a driver unit 17 coupled to the computer 12 and to the screen 16. In other situations, projection means (not shown) may be available for projecting images from the display monitor 13 of the computer 10 onto a larger screen.

A multimedia presentation delivers its message with music, voice-overs, vivid images, and motion in addition to text and graphics. Sound may be produced in a Wave Audio File, a MIDI (Musical Instrument Digital Interface) file, and CD Audio formats. Video may be provided in digital file format or in video disk overlay. If Windows 3.1 is used, animation may be provided in file formats that are compatible with a standard known as the Media Control Interface (MCI) standard, since Windows 3.1 provides the MCI and, in addition, provides three MCI drivers: one controls the MIDI sequencer, one controls sound for Wave Audio Files, and one controls sound for CD Audio devices.

It should be noted that some GUIs provide the capability to invert the typical functionality of the pointing device buttons. Therefore, while the so-called left button is active according to the usual convention, the fight button may become active if so desired by the user. Thus, for purposes of describing the present invention, the first button refers to the usually active button for selecting objects and icons and initiating actions according to the prior art, and the second button will refer to the newly added functionality of a pointing device according to the present invention.

In operation, according to the present invention, actuating the second button on the pointing device when the cursor is directly over an object on a slide initiates display of a menu having a button bar at the top for that object and which provides a list of specific commands and operations available to the user for operating on the selected object. Thus, objects, background and slides may all be modified according to such pop-up menus.

Figure 2:
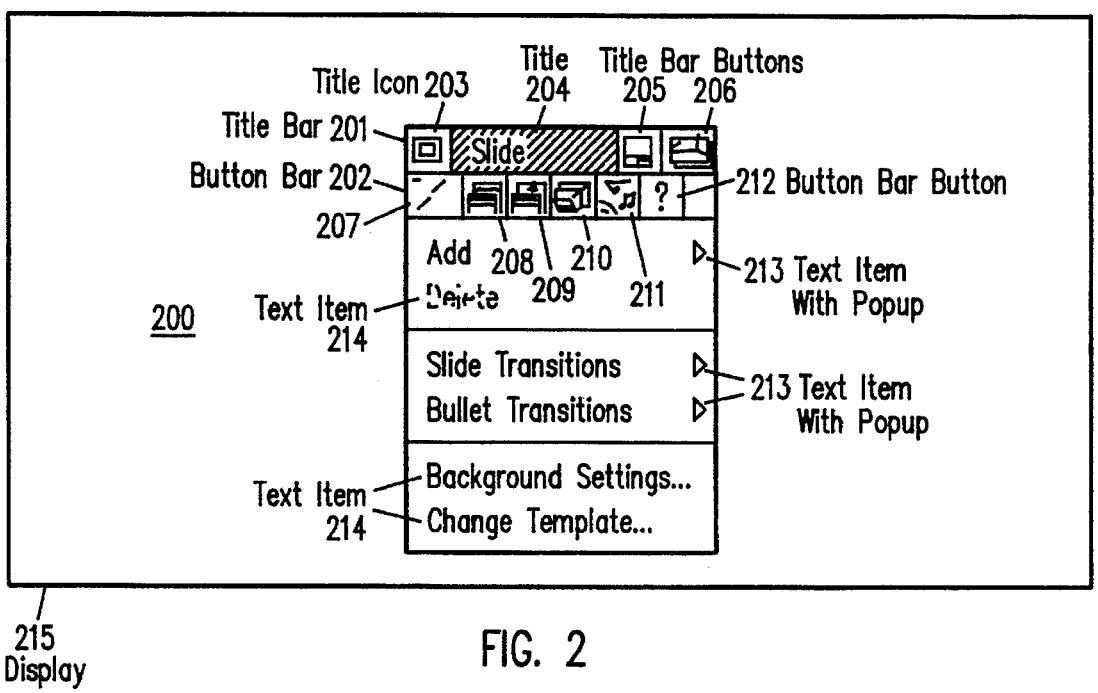
FIG. 2 illustrates a moveable enhanced tracked popup menu constructed according to the principles of the present invention.

Referring to FIG. 2, an example of a moveable enhanced tracked popup menu 200 which has been created in response to a user request (i.e. a right click) is shown. The actual text strings and symbols (icons) have no particular meaning and are included only as an example of use. Popup menu 200 may be overlaid on display 215.

With continuing reference to FIG. 2, title bar 201 is an area at the top of the enhanced tracked popup menu reserved for a menu title, icon and buttons. The icon and title are symbol and text string typically used to communicate the name or context of the menu. The buttons can be used to present operations which the user may select. The implementer of the menu is free to include all, some, or none of these elements in the title bar. In fact, the implementer of the menu can elect not to include the title bar. Also, there is no limit to the number of title bar buttons that may be included by the implementer. The menu is automatically sized to display the icon, title, and buttons with no overlap.

Button bar 202 is an area directly below the title bar that contains a horizontal tiling of buttons. There is no limit to the number of buttons which may be included. Thus, the button bar has all the normal functionality of a toolbar. As with the title bar, the implementer may elect to not include a button bar.

Below button bar 202, the implementer of the menu is free to include as many text items as desired. Some text items may have attached popup menus themselves. The implementer of the menu may elect to not include any text items.

Title icon 203 is a symbol specified by the implementer of the menu for whatever purpose. It is typically used to visually communicate to the user the name or context of the menu.

Title 204 is a text string specified by the implementer of the menu for whatever purpose. It is typically used to communicate to the user the name or context of the menu.

Figure 3:
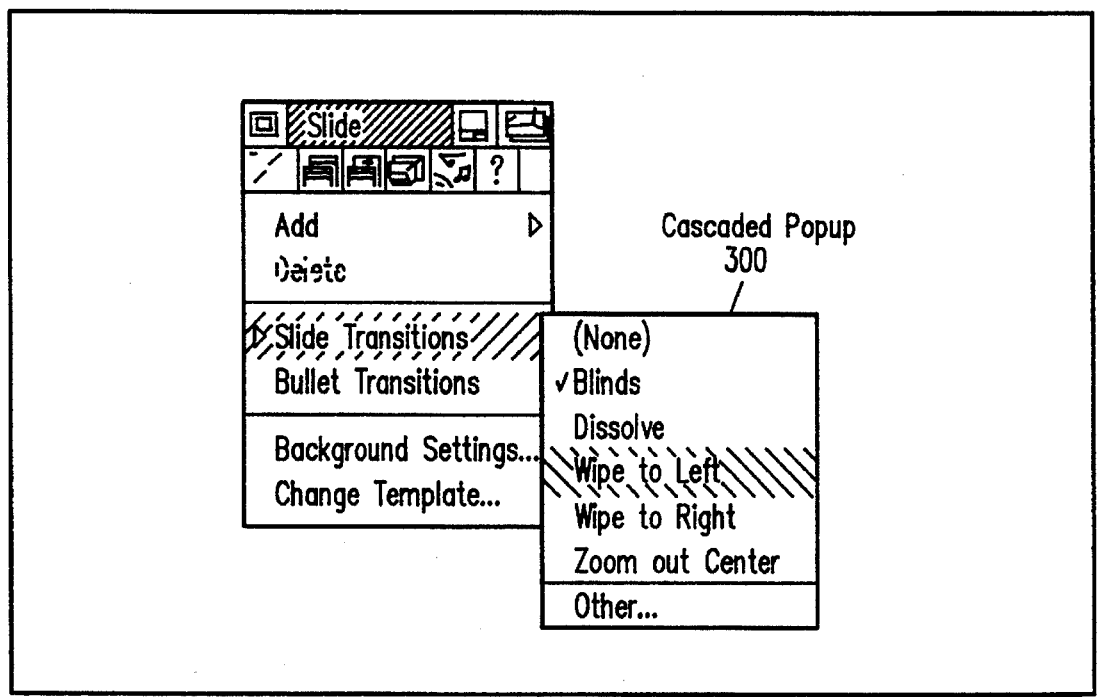
FIG. 3 illustrates the moveable enhanced tracked popup menu of FIG. 2 with a cascaded popup menu.

Title bar buttons 205 and 206 are normal buttons which may be used to represent an operation to the user. Button bar buttons 207–212 are buttons on the button bar that may be used by the implementer to represent an operation available to the user. Text items with popup 213 are conventional text items 214 with an associated popup menu 300. Selecting this item will bring up cascaded popup menu 300 as shown in FIG. 3. Cascaded popup menu 300 may be overlaid on display 215.

Textual menus with cascading popup menus are well described in the documentation for GUIs that support them like Windows. The enhanced tracked popup menus of the present invention support the industry standard behaviors for such items with no extensions or modifications. The enhanced tracked popup menu of the present invention is typically created by an application program in response to a mouse right click.

The title bar of the enhanced tracked popup menu responds to the mouse in a couple of ways. First, the menu may be moved around on the screen by click and holding the left or fight mouse button down on the title icon, title text or the background of the title bar. While holding the mouse button down, moving the mouse (moving the cursor) will drag a frame of the menu around on the screen. Releasing the button will display the image of the menu at the new location (within the frame) and erase it from its old location. Thus, enhanced tracked popup menus are movable.

If the user clicks a title bar button, the button responds as an other standard buttons for the GUI. Clicking the button, however, dismisses the menu (removes it from the screen). The implementation of the menu is notified of this action (see next section).

The button bar buttons behave the same as the buttons in the title bar. They behave as standard button for the GUI. Clicking the button will dismiss the menu and notify the implementation of the user's selection.

If the user clicks and holds on the background of the button bar, then the menu may be moved to a new location on the screen in the exact same manner as described for the title bar.

The arrow keys may be used to move about the elements of an enhanced tracked popup menu. When the focus is in the title bar or the button bar, then the left or right arrow keys may be used to move from button to button. The focus is indicated by a dotted line around the icon of the button with the current focus. The up and down arrow keys may be used to move from the title bar or button bar to the next items and conversely.

Buttons in the title bar and the button bar may be selected by pressing the entry key. This action dismisses the menu and notifies the implementation of the action. The menu may be dismissed at any time by pressing the escape key.

The present invention was implemented by extending the functionality of the Microsoft Windows TrackPopupmenu function call. This function can be used by any programmer using the Microsoft Windows environment to create a tracked popup menu. However, the function only provides menus with individual text and image items. It does not provide a title bar or a button bar as previously described.

It should be noted that even though this implementation of enhanced track popup menu uses the TrackPopupMenu function call, it could have been created by making other calls to the environment that allows the construction of tracked popup menu functionality. TrackPopupMenu function call was used for convenience in this embodiment.

The implementor creates an enhanced track popup menu by calling rcTrackFancyMenu. This function constructs an enhanced menu from a definition provided as an argument to the function call. Other arguments to the function control the options for the menu behavior and specify where and how selection notifications are sent to the implementation. Upon entry into the rcTrackFancyMenu, the code creates a track popup menu with the appropriate number of entries for items as specified in the description of the enhanced menu. It also creates one OWNERDRAW menu item at the top of the menu for the title bar and the button bar (if the implementer requested these elements). When the menu is displayed, the OWNERDRAW menu item is drawn including the elements specified in the enhanced menu description. These elements are title icon, title text, button bar buttons, and the like. Thus, when the menu first appears, it usually represents the definition of the enhanced menu.

In addition to computing and rendering the display of the menu as specified by the enhanced menu description, rcTrackFancyMenu sets a system message hook to monitor all the messages flowing in the system. This is necessary so the code can detect mouse and keyboard activity involving the enhanced track popup menu. OWNERDRAW items in a menu do not differentiate mouse and keyboard activity for elements of a single item. So, even though the button bar contains numerous button images, the regular track popup menu code does not communicate which button is selected by the user. Any click or enter key on a particular menu item, OWNERDRAW or not, will result in a single notification and dismissal of the menu. To enable the user to select any item on the title bar or the button bar, rcTrackFancyMenu monitors the mouse and keyboard messages. When a message comes through the filter, the code determines if it involves a title bar or a button bar and takes the appropriate action. If it does not, then the message is left along to flow through the system in the conventional manner.

However, if the message involves the title bar or the button bar, then rcTrackFancyMenu processes the message further, as for example when a mouse click occurs. The mouse message goes to the message filter and the rcTrackFancyMenu code does a hit test to determine if the click occurred on the title bar or the button bar. If it did, then the message is intercepted and the appropriate enhanced track popup menu action is done. This may be click a button or move the menu.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. The invention illustratively disclosed herein may be practiced without any element which is not specifically disclosed herein.

The following is a Warnier/Orr diagram for the Right Click portion of the Compel UI used herein as an example. This is a functional diagram conventionally employed in the computer industry to indicate computer programming in much the same way that pseudo code is employed.

```
                          (                    ( Set up routine variables
                          ( Interpret Definition ( Pause enhanced menu resource
                          (                                ( Create HMenu with owner draw item
                          (                    ( Install hook
                          (                    ( Subclass application window
                          ( (a) Create Enhanced (
                          (   Tracked          ( Display Enhanced   ( Call TrackPopupMenu ()
                          (   Popup Menu       ( Tracked Popup Menu ( handle owner draw requests
          TRACK           (
          EN-             ( if mouse           ( if title drag area  ( if move      ( dismiss menu
          HANCED          (                    (                     ( else         ( go to (a)
          POPUP           (                    (                                    ( go to (b)
          MENU            (
                          ( (b) Message Filter (                     ( if button    ( if down  ( draw down look for button
                          (                    (                     (              (          ( capture   ( if button   ( notify app
                          (                    (                     (              (          ( mouse     (             ( of selection
                          (                    (                     (              (          ( until up  (             ( go to (c)
                          (                    (                     (              (          (           (
                          (                    (                     (              (          (           ( else        ( draw up look
                          (                    (                     (              (          (           (             ( go to (c)
                          (                    (                     (              ( else ( go to (b)
                          (                    (                     ( else    { forward to Windows
                          (                    (                     (
                          (                    ( if keyboard        ( if focus in button  ( if "—>", focus next button
                          (                    (                    (                     ( if "<—", focus prev. button
                          (                    (                    (                     ( if "return",    ( notify app of selection
                          (                    (                    (                     (                 ( go to (c)
                          (                    (                    ( else                ( else            ( forward to Windows
                          (                    (                    (
                          (                    ( else               ( forward to Windows
                          (
                          ( (c) Dismiss Menu
                          (
                          ( Cleanup
```

We claim:

1. A system for providing a moveable, tracked popup menu comprising:

a programmed computer including an operating system;

a monitor coupled to the programmed computer for providing a display;

a pointing device coupled to the computer for positioning a cursor on the display, the cursor being generating by the programmed computer on the display, the pointing device having a first and a second button, a first button to select objects and icons and to initiate an action and a second button to actuate the popup menu, the pointing device being selected from a group consisting of a mouse and a trackball;

a plurality of multi-media devices coupled to the computer and operable from the popup menu for providing a multi-media slide presentation with the programmed computer, the multi-media devices include a sound system, a video disc drive, a compact disc read only memory, a photo compact disc drive, an video cassette recorder, the multi-media presentation including both visual an auditory information presented with aid of the programmed computer;

a graphical user interface for cooperating with the operating system for providing the multi-media slide presentation;

the popup menu displayed on the display by actuation and release of the second control button provided the cursor is positioned directly over an object on a slide of the multi-media slide presentation on the display, the popup menu having various graphical elements including text strings, icons, a button bar, a title bar, textual menu items with at least one menu item associated with a second popup menu, title bar icons associated with at least some of the icons, and title bar buttons, the button bar including a plurality of buttons, each button bar button and textual menu item corresponding to a user selectable operation on the object, the popup menu being context sensitive, the graphical user interface operative with the programmed computer for providing an operating environment in which to provide a visual image of the popup menu on the display, the popup menu not being anchored to appear at a same place on the display every time the popup menu is invoked;

the popup menu automatically sized to display the text strings and icons without overlap;

a keyboard coupled to the programmed computer for providing input for a user to shift focus from various graphical elements in the popup menu; and the popup menu being moved about the display after the popup menu has been invoked and while the popup menu is displayed on the display by actuation and holding the first or second control button.

* * * * *